United States Patent
Sung et al.

(10) Patent No.: US 10,021,259 B1
(45) Date of Patent: Jul. 10, 2018

(54) SCANNING DEVICE AND PAPER FEEDING MODULE

(71) Applicant: KINPO ELECTRONICS, INC., New Taipei (TW)

(72) Inventors: Hung-Huan Sung, New Taipei (TW); Shih-His Chiang, New Taipei (TW); Tzu-Cheng Chang, New Taipei (TW)

(73) Assignee: KINPO ELECTRONICS, INC., New Taipei (TW)

( * ) Notice: Subject to any disclaimer, the term of this patent is extended or adjusted under 35 U.S.C. 154(b) by 0 days.

(21) Appl. No.: 15/452,580

(22) Filed: Mar. 7, 2017

(30) Foreign Application Priority Data

Jan. 12, 2017 (CN) .......................... 2017 1 0022614

(51) Int. Cl.
 *H04N 1/04* (2006.01)
 *H04N 1/00* (2006.01)
 *B65H 5/06* (2006.01)
 *B65H 31/00* (2006.01)

(52) U.S. Cl.
 CPC .......... *H04N 1/00572* (2013.01); *B65H 5/06* (2013.01); *B65H 31/00* (2013.01); *H04N 1/00588* (2013.01); *H04N 2201/0081* (2013.01)

(58) Field of Classification Search
 CPC .......... H04N 1/00572; H04N 1/00588; H04N 2201/0081
 USPC ......................................... 358/498, 472, 474
 See application file for complete search history.

(56) References Cited

U.S. PATENT DOCUMENTS

| 5,280,368 | A | 1/1994 | Fullerton |
| 7,411,704 | B2 | 8/2008 | Wang |
| 7,457,006 | B2 | 11/2008 | Wilsher et al. |
| 8,004,727 | B2 * | 8/2011 | van Os .............. H04N 1/00827 358/473 |
| 8,730,537 | B2 | 5/2014 | Lien |
| 2008/0159793 | A1 | 7/2008 | Park |
| 2009/0086276 | A1 * | 4/2009 | Tanaka ............... H04N 1/00572 358/401 |
| 2012/0314266 | A1 | 12/2012 | Natalaray et al. |
| 2013/0182298 | A1 | 7/2013 | Tu et al. |
| 2014/0240802 | A1 * | 8/2014 | Otomo ................. H04N 1/1017 358/497 |

OTHER PUBLICATIONS

Official actions issued by European Patent Office dated Nov. 14, 2017.

* cited by examiner

*Primary Examiner* — Houshang Safaipour
(74) *Attorney, Agent, or Firm* — Chun-Ming Shih; HDLS IPR Services (57) ABSTRACT

A paper feeding module includes a main body (100). A working plane (101) is formed on an external surface of the main body (100), a slot channel (110) is defined in the main body (100), a paper inlet (111) and a paper outlet (112) are formed at respective two ends of the slot channel (110), an output roller assembly (122) is arranged at the paper outlet (112), an opening (102) communicating with one side of the slot channel (110) is defined on the working plane (101), a scanning assembly (200) is arranged in the slot channel (110) between the opening (102) and the output roller assembly (122) and is arranged opposite to the opening (102), and the scanning assembly (200) is exposed on an internal surface of the slot channel (110).

20 Claims, 7 Drawing Sheets

SCANNING DEVICE AND PAPER FEEDING MODULE

TECHNICAL FIELD

The present invention relates to a scanning device and, in particular, to a scanning device for double-sided scanning and a paper feeding module thereof.

BACKGROUND

An auto document feeder (ADF) is a paper feeding mechanism for a photocopying machine. The ADF can convey a whole stack of paper sheets one by one to make them pass through a scanner of the photocopying machine for scanning operations. A common photocopying machine can only scan one side of the paper sheet. By adding another scanner in the ADF, the other side of the paper sheet can also be scanned, so both sides of the paper sheet can be scanned in one paper feeding operation.

A simple configuration method, like disclosed in U.S. Pat. No. 7,457,006, U.S. Pat. No. 5,280,368, U.S. Pat. No. 7,411,704 and U.S. Pat. No. 8,730,537, is to include another scanner adjacent to the scanner of the photocopying machine. Generally, the scanner is a contact image sensor (CIS) scanner, so the paper sheet has to be in flat contact with the scanner for precise focus operations and better scanning quality. The two scanners are usually disposed opposite to each other. Therefore, after passing through one scanner, the paper sheet has to turn over instantly to come into flat contact with the other scanner. This motion can be achieved by utilizing a block for pressing paper sheets. However, this tends to cause twisting of the paper sheets and paper jams.

As a result, the target of the inventor is to solve the above-mentioned problems, on the basis of which the present invention is accomplished.

SUMMARY

The present invention provides a paper feeding module for double-sided scanning.

The present invention provides a paper feeding module. The paper feeding module includes a main body. A working plane is disposed on an external surface of the main body. A slot channel is defined in the main body. A paper inlet and a paper outlet are formed at respective two ends of the slot channel. An output roller assembly is arranged at the paper outlet, an opening communicating with one side of the slot channel is defined on the working plane, a scanning assembly is arranged in the slot channel between the opening and the output roller assembly, the scanning assembly is disposed in the slot channel and arranged at another side of the slot channel opposite to the opening, and the scanning assembly is exposed on an internal surface of the slot channel.

In the paper feeding module of the present invention, a ramp inclined with respect to the working plane is disposed in the slot channel, and the ramp is connected between the opening and the paper outlet. A level difference perpendicular to the working plane is formed between the paper outlet and the working plane. The main body includes a paper stacking container within a range of the level difference.

According to the paper feeding module of the present invention, a carrier and an actuation mechanism are disposed in the main body corresponding to the scanning assembly, an adjustment plate is disposed on the carrier, and the actuation mechanism pushes the carrier to the scanning assembly, so that the adjustment plate is brought into contact with the scanning assembly. A guide slot is defined in the main body, a slide pin is arranged protruding on the carrier, and the slide pin is inserted in the guide slot, so that the carrier is movable along the guide slot. The actuation mechanism includes a cam disposed corresponding to the carrier and includes a motor driving the cam. The actuation mechanism includes a solenoid valve driving the carrier. A press block and a resilient element are disposed in the main body, the press block is disposed corresponding to the scanning assembly, the resilient element is operatively connected to the press block, and the resilient element can push the press block toward the scanning assembly to bring the press block come into contact with the scanning assembly. The carrier includes a first guiding surface, the press block includes a second guiding surface in contact with the first guiding surface, and when the carrier moves toward the scanning assembly, the first guiding surface pushes the second guiding surface, thereby pushing the press block away from the scanning assembly.

In the paper feeding module, a press block is disposed in the main body corresponding to the opening, and the press block is movable to transversely pass through the slot channel to the opening.

The present invention provides a scanning device for double-sided scanning.

The present invention further provides a scanning device. The scanning device includes a light-transparent substrate, a main body and a movable scanner. A working plane in contact with one side of the light-transparent substrate is disposed on an external surface of the main body. A slot channel is defined in the main body, a paper inlet and a paper outlet are formed at respective two ends of the slot channel, an output roller assembly is arranged at the paper outlet, an opening communicating with one side of the slot channel is defined on the working plane, a scanning assembly is arranged in the slot channel between the opening and the output roller assembly, the scanning assembly is disposed in the slot channel and arranged at another side opposite to the opening, and the scanning assembly is exposed on an internal surface of the slot channel. The movable scanner is disposed on the other side of the light-transparent substrate corresponding to the opening toward the same, and the movable scanner and the scanning assembly are disposed toward two sides of the slot channel respectively.

A ramp inclined with respect to the working plane is disposed in the slot channel, and the ramp is connected between the opening and the paper outlet. A level difference perpendicular to the working plane is formed between the paper outlet and the working plane. The main body includes a paper stacking container within a range of the level difference.

A carrier and an actuation mechanism are disposed in the main body corresponding to the scanning assembly, an adjustment plate is disposed on the carrier, and the actuation mechanism pushes the carrier to the scanning assembly, so that the adjustment plate is brought into contact with the scanning assembly. A guide slot is defined in the main body, a slide pin is arranged protruding on the carrier, and the slide pin is inserted in the guide slot, so that the carrier is movable along the guide slot. The actuation mechanism includes a cam disposed corresponding to the carrier and includes a motor driving the cam. The actuation mechanism includes a solenoid valve driving the carrier. A press block and a resilient element are disposed in the main body, the press block is disposed corresponding to the scanning assembly, the resilient element is operatively connected to the press block, and the resilient element pushes the press block toward the scanning assembly to bring the press block into contact with the scanning assembly. The carrier includes a first guiding surface, the press block includes a second guiding surface in contact with the first guiding surface, and when the carrier moves toward the scanning assembly, the first guiding surface pushes the second guiding surface, thereby pushing the press block away from the scanning assembly.

In the scanning assembly of the present invention, a press block is disposed in the main body corresponding to the opening, and the press block is movable to transversely pass through the slot channel to the opening.

According to the scanning device and the paper feeding module thereof, the scanning assembly is disposed on the ramp between the opening and the output roller assembly, thereby preventing distorting the paper sheets and avoiding paper jams.

BRIEF DESCRIPTION OF THE DRAWINGS

The disclosure will become more fully understood from the detailed description, and the drawings given herein below is for illustration only, and thus does not limit the disclosure, wherein.

DETAILED DESCRIPTION

Referring to FIGS. 1 to 4, the first embodiment of the present invention provides a paper feeding module. The paper feeding module is disposed on a scanning device to automatically convey paper sheets consecutively to a photocopying machine, so that the photocopying machine can scan the paper sheets. The paper feeding machine is for double-sided photocopying. The photocopying machine scans one side of the paper sheet, and the paper feeding module not only can feed the paper sheets consecutively but also can scan the other side of the paper sheet.

The paper feeding module includes a main body 100. The main body 100 has a working plane 101. The working plane 101 is in contact with a light-transparent substrate 10 on a top of a photocopying machine. A slot channel 110 is defined in the main body 100 for feeding the paper sheets. In the present embodiment, the slot channel 110 is preferably in a U shape. A paper inlet 111 and a paper outlet 112 are formed at respective two ends of the slot channel 110. An input roller assembly 121 is arranged at the paper inlet 111. An output roller assembly 122 is arranged at the paper outlet 112. An opening 102 communicating with one side of the slot channel 110 is defined on the working plane 101. The opening 102 is provided so that through the opening 102 a movable scanner 20 of the photocopying machine can scan the paper sheets in the slot channel 110. The scanning assembly 200 is disposed in the slot channel 110, and the scanning assembly 200 and the opening 102 are arranged at two opposite sides of the slot channel 110, so the movable scanner 20 of the photocopying machine and the scanning assembly 200 can respectively scan two sides of the paper sheet in the slot channel 110.

A level difference D perpendicular to the working plane 101 is formed between the paper outlet 112 and the working plane 101. The main body 100 includes a paper stacking container 130 within a range of the level difference D. A ramp 113 inclined with respect to the working plane 101 is disposed in the slot channel 110 between the opening 102 and the paper outlet 112, so as to divert the paper sheet to cross the level difference D and send the paper sheets into the paper stacking container 130. The scanning assembly 200 is disposed on the ramp 113 between the opening 102 and the output roller assembly 122.

A carrier 310 and an actuation mechanism 320 are disposed in the main body 100 corresponding to the scanning assembly 200. An adjustment plate 311 is disposed on the carrier 310. The actuation mechanism 320 pushes the carrier 310 to the scanning assembly 200, so that the adjustment plate 311 is brought into contact with the scanning assembly 200. In the present embodiment, the actuation mechanism 320 includes a cam 321 disposed corresponding to the carrier 310 and includes a motor 322 driving the cam 321. A guide slot 103 is defined in the main body 100, a slide pin 312 is arranged protruding on the carrier 310, and the slide pin 312 is inserted in the guide slot 103, so that the carrier 310 is movable along the guide slot 103.

A press block 400 and a resilient element 410 are disposed in the main body 100, the press block 400 is disposed corresponding to the scanning assembly 200, the resilient element 410 is operatively connected to the press block 400, and the resilient element 410 pushes the press block 400 toward the scanning assembly 200 to bring the press block 400 into contact with the scanning assembly 200. The carrier 310 includes a first guiding surface 313; the press block 400 includes a second guiding surface 401 in contact with the first guiding surface 313. When the carrier 310 moves toward the scanning assembly 200, the first guiding surface 313 pushes the second guiding surface 401 to push the press block 400 away from the scanning assembly 200. Another press block 500 is disposed in the main body 100 corresponding to the opening 102. The press block 500 is movable to transversely pass through the slot channel 110 to the opening 102.

Figure 5:
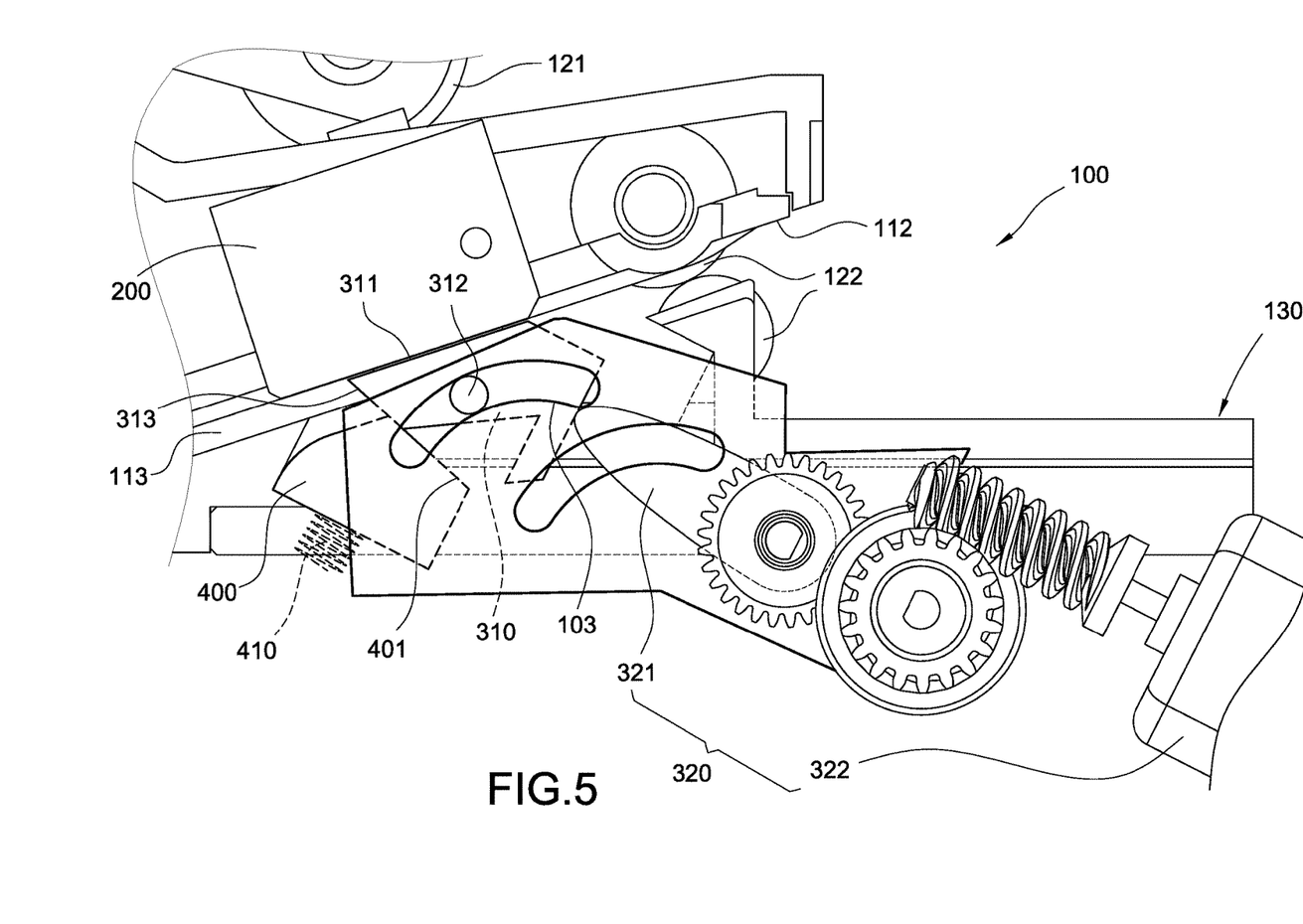
FIG. 5 is a schematic view illustrating motions of the scanning device according to the first embodiment of the present invention.

Referring to FIG. 5, before paper feeding begins, the motor 322 of the actuation mechanism 320 rotates to drive rotation of the cam 321, the carrier 310 is thereby pushed toward the scanning assembly 200. At the same time, a first guiding surface 313 of the carrier 310 pushes the second guiding surface 401 of the press block 400 to push the press block 400 away from the scanning assembly 200, and the cam 321 keeps pushing the carrier 310 until the adjustment plate 311 is in contact with the scanning assembly 200. The scanning assembly 200 performs scanning operations and adjusts colors. Then, the motor 322 rotates in an opposite direction, so that the cam 321 moves backwards to release the carrier 310. The press block 400 is pushed by the resilient element 410 and moves to contact the scanning assembly 200. When the carrier 310 is released, the second guiding surface 401 of the press block 400 pushes the first guiding surface 313 of the carrier 310 to make the carrier 310 move away from the scanning assembly 200.

Figure 1:
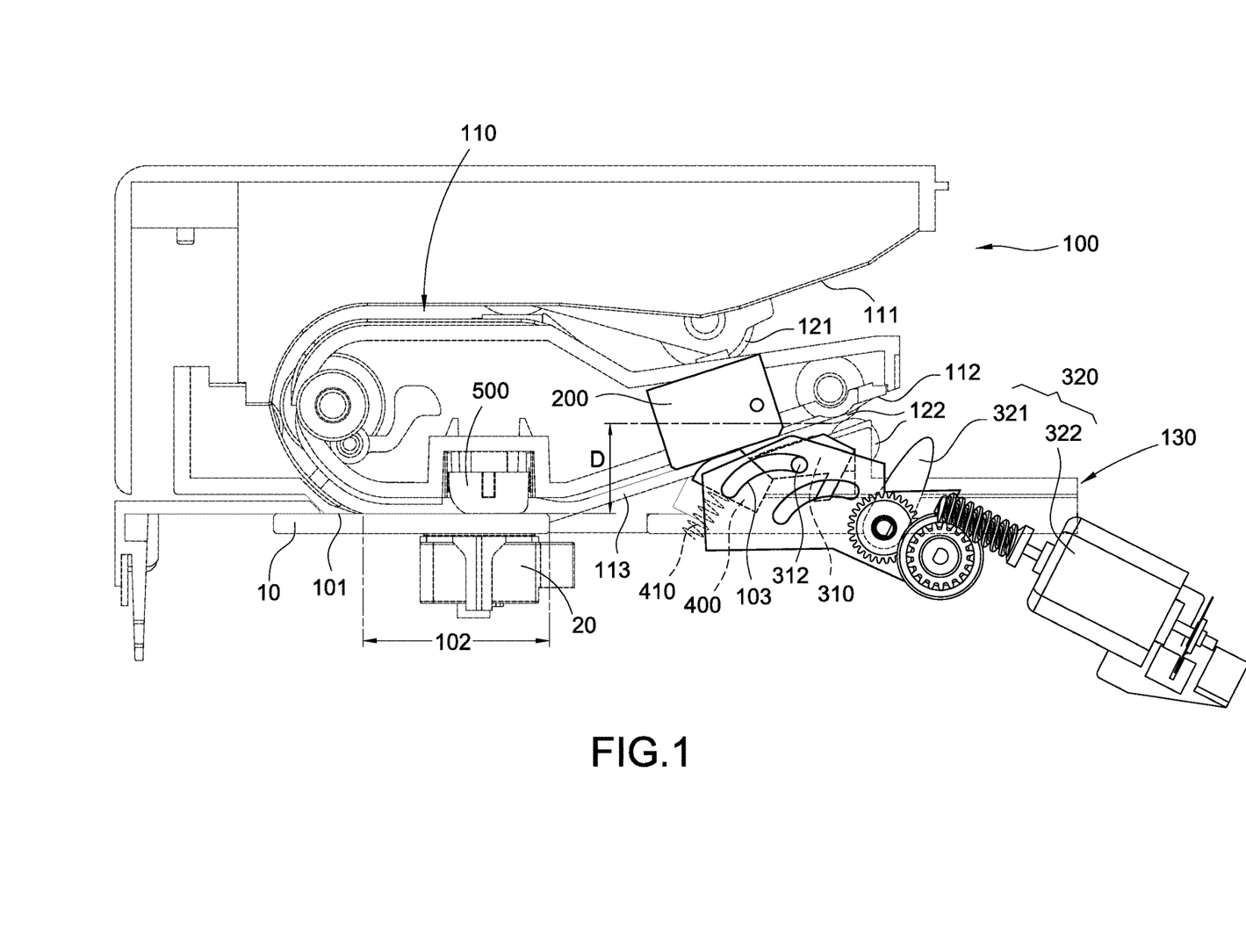
FIG. 1 is a lateral view illustrating a scanning device according to the first embodiment of the present invention.
Figure 2:
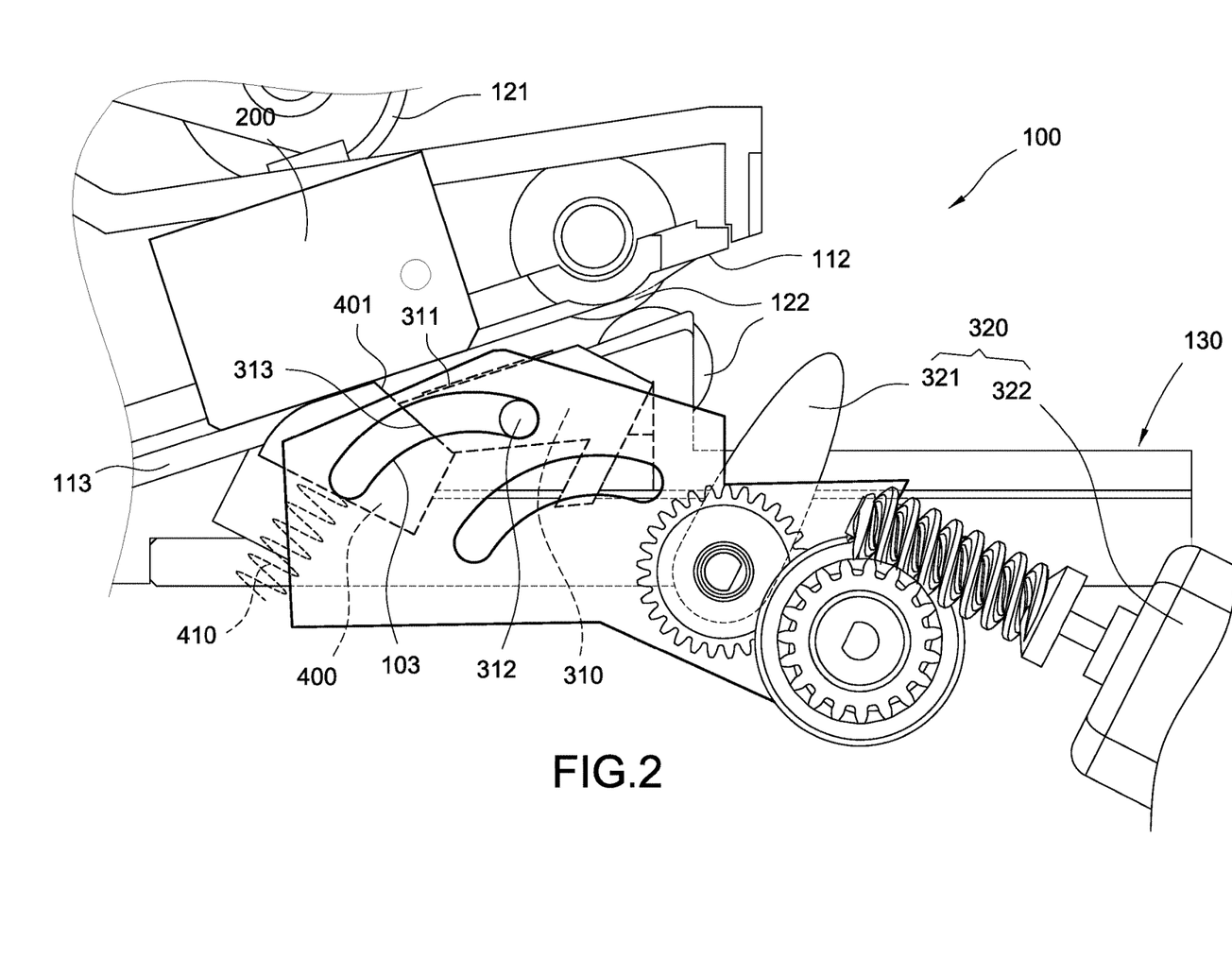
FIG. 2 is a partially enlarged view of FIG. 1.
Figure 3:
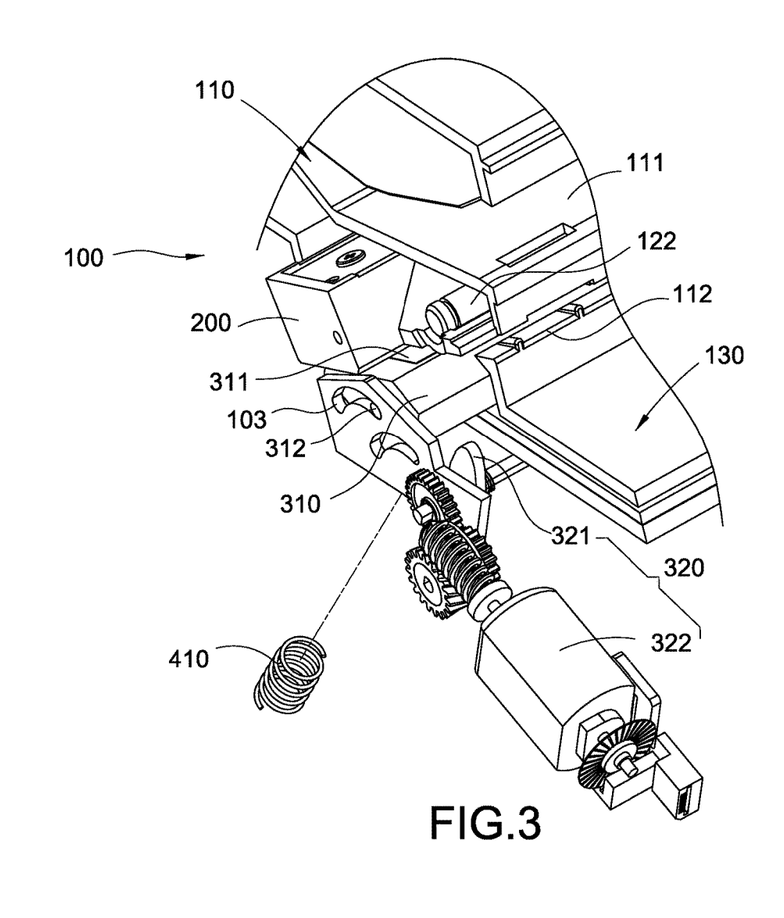
FIG. 3 is a perspective view illustrating the scanning device according to the first embodiment of the present invention.
Figure 4:
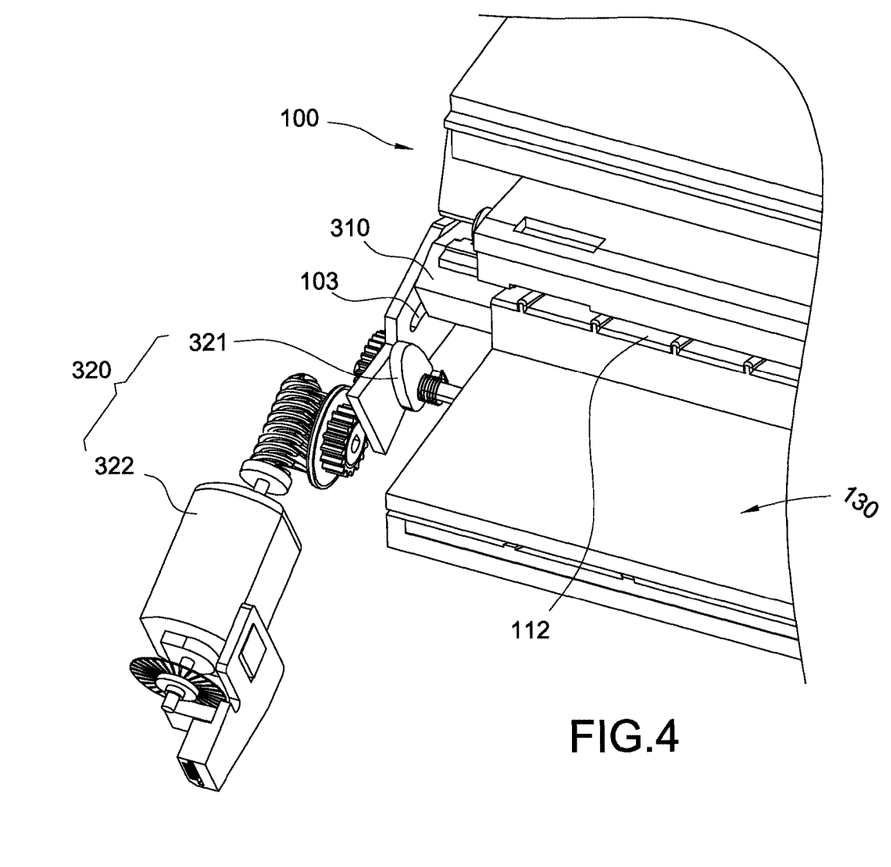
FIG. 4 is another perspective view illustrating the scanning device according to the first embodiment of the present invention.

Referring to FIG. 1, when the paper sheet passes through the opening 102, the movable scanner 20 of the photocopying machine, which is fixed in the opening 102, performs scanning operations, and the press block 500 in the opening 102 can press the paper sheet and make it in flat contact with the light-transparent substrate 10 of the photocopying machine so as to scan one side of the paper sheet. When the paper sheets consecutively pass through the ramp 113, the press block 400 of the scanning assembly 200, disposed corresponding to the scanning assembly 200, is pushed by the resilient element 410 to thereby press the paper sheet in flat contact with the scanning assembly 200 so as to scan the other side of the paper sheet.

Figure 6:
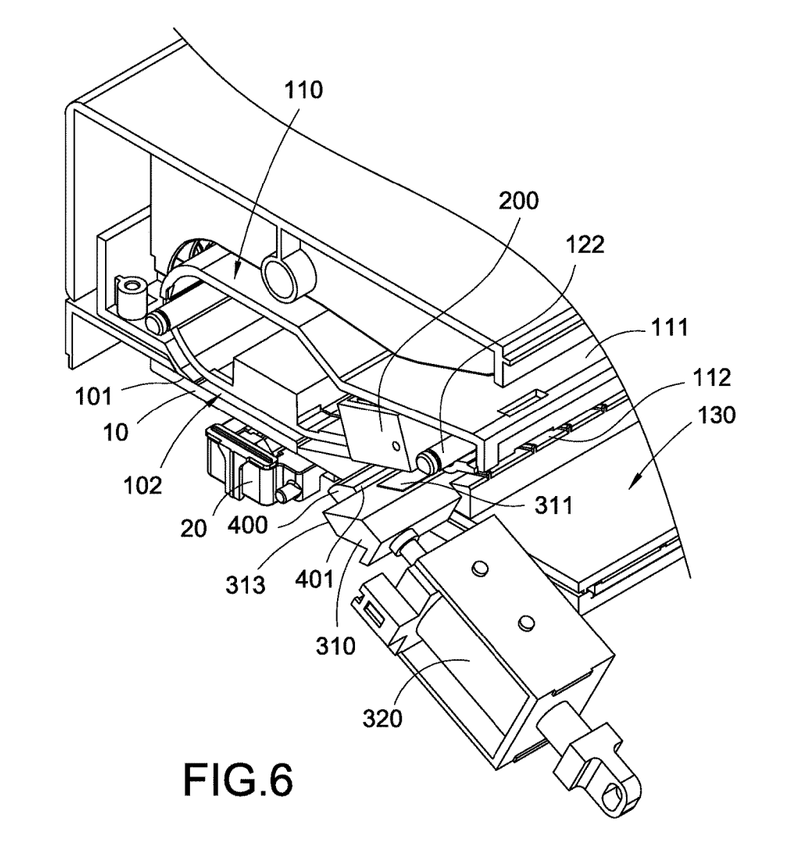
FIG. 6 is a perspective view illustrating the scanning device according to the second embodiment of the present invention.
Figure 7:
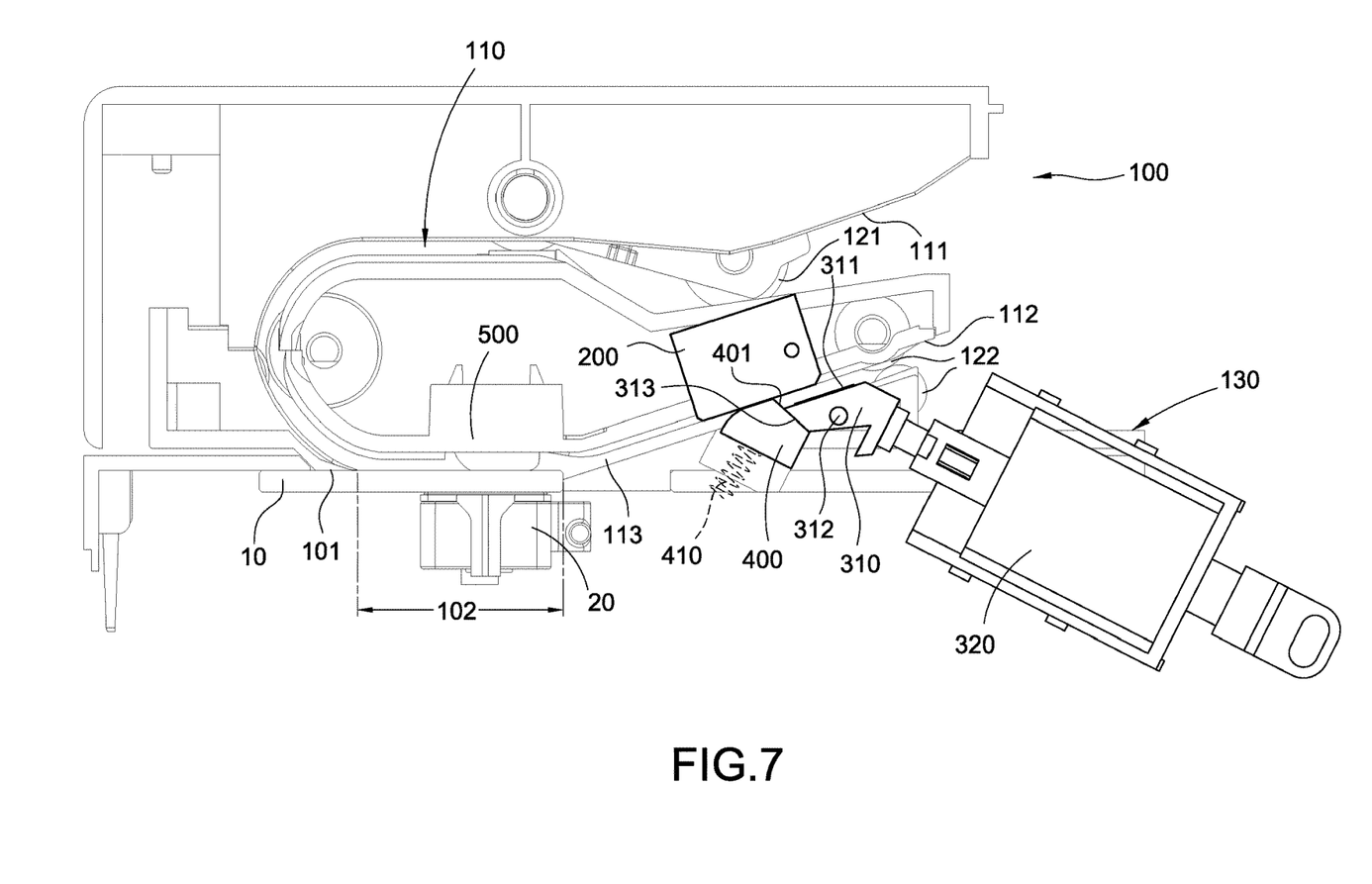
FIG. 7 is a lateral view illustrating the scanning device according to the second embodiment of the present invention.

Referring to FIGS. 6 and 7, the second embodiment of the present invention provides a paper feeding module. The paper feeding module includes a main body 100 having a working plane 101. A slot channel 110 is defined in the main body 100, a paper outlet 112 is formed at one end of the slot channel 110, an output roller assembly 122 is arranged at the paper outlet 112, an opening 102 communicating with one side of the slot channel 110 is defined on the working plane 101, a scanning assembly 200 is disposed in the slot channel 110, and the scanning assembly 200 is disposed between the opening 102 and the output roller assembly 122. The structure is similar to the first embodiment, so the same details are not repeated for brevity.

The present embodiment is different from the first embodiment in that, the actuation mechanism 320 includes a solenoid valve, and the solenoid valve drives the carrier 310. Before paper feeding begins, the solenoid valve is activated to drive rotation of the cam 321 so as to push the carrier 310 toward the scanning assembly 200 until the adjustment plate 311 is in contact with the scanning assembly 200. At the same time, the guiding surface of the carrier 310 pushes the second guiding surface 401 of the press block 400 to push the press block 400 away from the scanning assembly 200. The scanning assembly 200 performs scanning operations and adjusts colors. Then, the solenoid valve is turned off to release the carrier 310. The press block 400 is pushed by the resilient element 410 to move to contact the scanning assembly 200. When the carrier 310 is released, the second guiding surface 401 of the press block 400 pushes the first guiding surface 313 of the carrier 310 so as to push the carrier 310 away from the scanning assembly 200.

In the paper feeding module, the scanning assembly 200 is disposed on the ramp 113 between the opening 102 and the output roller assembly 122. Therefore, after the paper sheet passes through the opening 102, the paper sheet is diverted by the ramp 113, and the paper sheet is thus prevented from being distorted by the press block 500 in the opening 102, and at the same time the paper sheet can be pulled flat by the output roller assembly 122 to avoid paper jams.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A paper feeding module, comprising a main body, a working plane being formed on an external surface of the main body, a slot channel being defined in the main body, a paper inlet and a paper outlet being formed at respective two ends of the slot channel, an output roller assembly being arranged at the paper outlet, an opening communicating with one side of the slot channel being defined on the working plane, a scanning assembly being arranged in the slot channel between the opening and the output roller assembly, the scanning assembly being disposed in the slot channel and arranged at another side of the slot channel opposite to the opening, the scanning assembly being exposed on an internal surface of the slot channel;
   wherein a carrier and an actuation mechanism are disposed in the main body corresponding to the scanning assembly, an adjustment plate is disposed on the carrier, and the actuation mechanism pushes the carrier to the scanning assembly, so that the adjustment plate is brought into contact with the scanning assembly.

2. The paper feeding module of claim 1, wherein a level difference perpendicular to the working plane is formed between the paper outlet and the working plane.

3. The paper feeding module of claim 2, wherein the main body includes a paper stacking container within a range of the level difference.

4. The paper feeding module of claim 1, wherein a guide slot is defined in the main body, a slide pin is arranged protruding on the carrier, and the slide pin is inserted in the guide slot, so that the carrier is movable along the guide slot.

5. The paper feeding module of claim 1, wherein the actuation mechanism includes a cam disposed corresponding to the carrier and includes a motor driving the cam.

6. The paper feeding module of claim 1, wherein the actuation mechanism includes a solenoid valve driving the carrier.

7. The paper feeding module of claim 1, wherein a press block and a resilient element are disposed in the main body, the press block is disposed corresponding to the scanning assembly, the resilient element is operatively connected to the press block, and the resilient element pushes the press block toward the scanning assembly to bring the press block into contact with the scanning assembly.

8. The paper feeding module of claim 7, wherein the carrier includes a first guiding surface, the press block includes a second guiding surface in contact with the first guiding surface, and when the carrier moves toward the scanning assembly, the first guiding surface pushes the second guiding surface to push the press block away from the scanning assembly.

9. The paper feeding module of claim 1, wherein a press block is disposed in the main body corresponding to the opening, and the press block is movable to transversely pass through the slot channel to the opening.

10. The paper feeding module of claim 1, wherein a ramp inclined with respect to the working plane is disposed in the slot channel, and the ramp is connected between the opening and the paper outlet.

11. A scanning device, comprising:
   a light-transparent substrate;
   a main body, a working plane in contact with one side of the light-transparent substrate being formed on an external surface of the main body, a slot channel being defined in the main body, a paper inlet and a paper outlet being formed at respective two ends of the slot channel, an output roller assembly being arranged at the paper outlet, an opening communicating with one side of the slot channel being defined on the working plane, a scanning assembly being arranged in the slot channel between the opening and the output roller assembly, the scanning assembly being disposed in the slot channel and arranged at another side of the slot channel opposite to the opening, the scanning assembly being exposed on an internal surface of the slot channel; and a movable scanner, the movable scanner being disposed on the other side of the light-transparent substrate corresponding to the opening toward the same, the movable scanner and the scanning assembly facing toward two sides of the slot channel respectively;

wherein a carrier and an actuation mechanism are disposed in the main body corresponding to the scanning assembly, an adjustment plate is disposed on the carrier, and the actuation mechanism pushes the carrier to the scanning assembly, so that the adjustment plate is brought into contact with the scanning assembly.

12. The scanning device of claim 11, wherein a level difference perpendicular to the working plane is formed between the paper outlet and the working plane.

13. The scanning device of claim 12, wherein the main body includes a paper stacking container within a range of the level difference.

14. The scanning device of claim 11, wherein a guide slot is defined in the main body, a slide pin is arranged protruding on the carrier, and the slide pin is inserted in the guide slot, so that the carrier is movable along the guide slot.

15. The scanning device of claim 11, wherein the actuation mechanism includes a cam disposed corresponding to the carrier and includes a motor driving the cam.

16. The scanning device of claim 11, wherein the actuation mechanism includes a solenoid valve driving the carrier.

17. The scanning device of claim 11, wherein a press block and a resilient element are disposed in the main body, the press block is disposed corresponding to the scanning assembly, the resilient element is operatively connected to the press block, and the resilient element pushes the press block toward the scanning assembly so as to bring the press block into contact with the scanning assembly.

18. The scanning device of claim 17, wherein the carrier includes a first guiding surface, the press block includes a second guiding surface in contact with the first guiding surface, and when the carrier moves toward the scanning assembly, the first guiding surface pushes the second guiding surface, thereby pushing the press block away from the scanning assembly.

19. The scanning device of claim 11, wherein a press block is disposed in the main body corresponding to the opening, and the press block is movable to transversely pass through the slot channel to the opening.

20. The scanning device of claim 11, wherein a ramp inclined with respect to the working plane is disposed in the slot channel, and the ramp is connected between the opening and the paper outlet.

* * * * *